Figure 1:
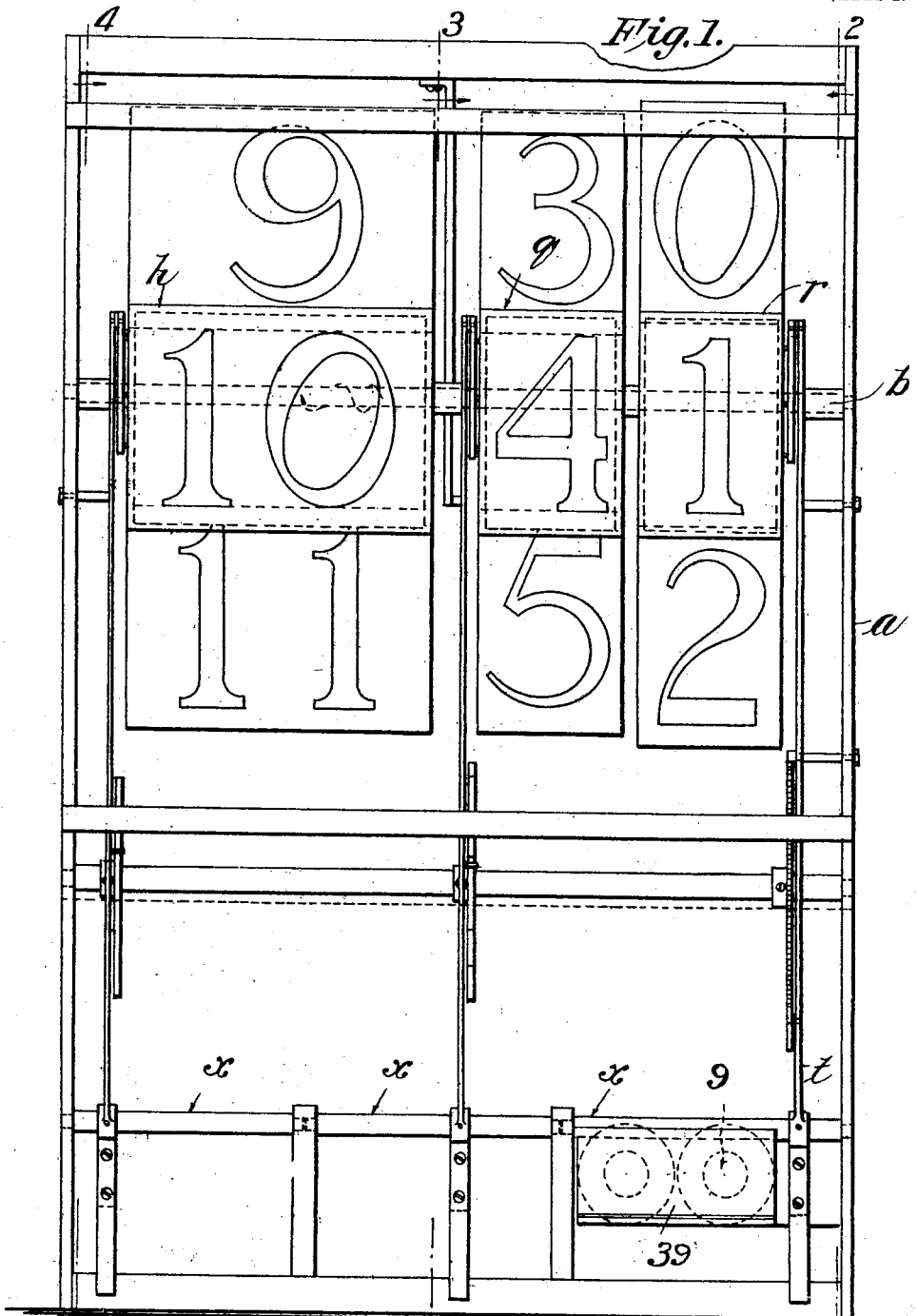

S. P. THRASHER.
TIME INDICATING DEVICE.
APPLICATION FILED SEPT. 4, 1906.

905,956.

Patented Dec. 8, 1908.
5 SHEETS—SHEET 1.

S. P. THRASHER.
TIME INDICATING DEVICE.
APPLICATION FILED SEPT. 4, 1906.

905,956.

Patented Dec. 8, 1908.
5 SHEETS—SHEET 2.

Witnesses:
H. L. Sprague
H. W. Bourn

Inventor:
Samuel P. Thrasher.
by Chapin & Co.
Attorneys.

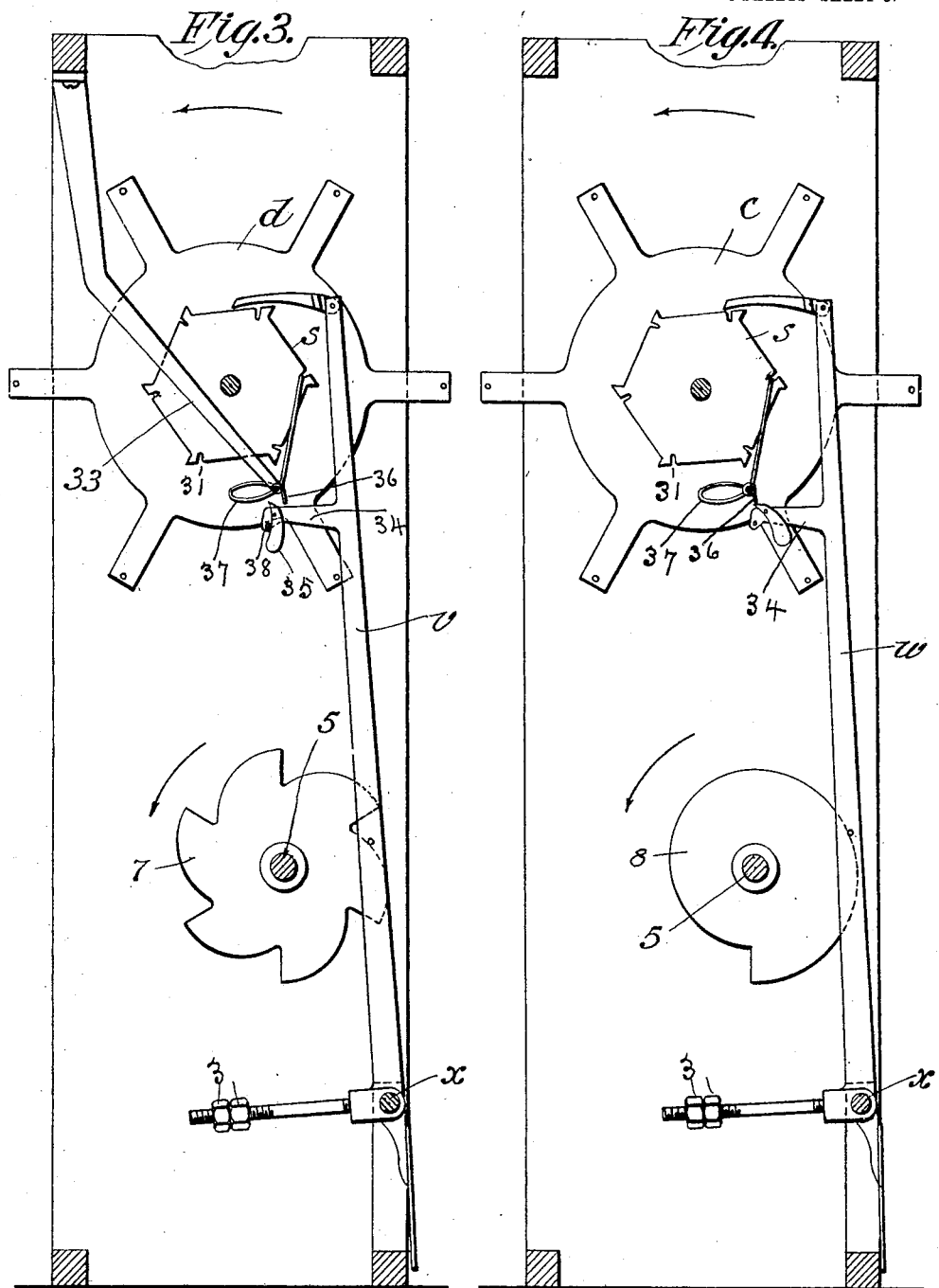

S. P. THRASHER.
TIME INDICATING DEVICE.
APPLICATION FILED SEPT. 4, 1906.
905,956.
Patented Dec. 8, 1908.
5 SHEETS—SHEET 4.
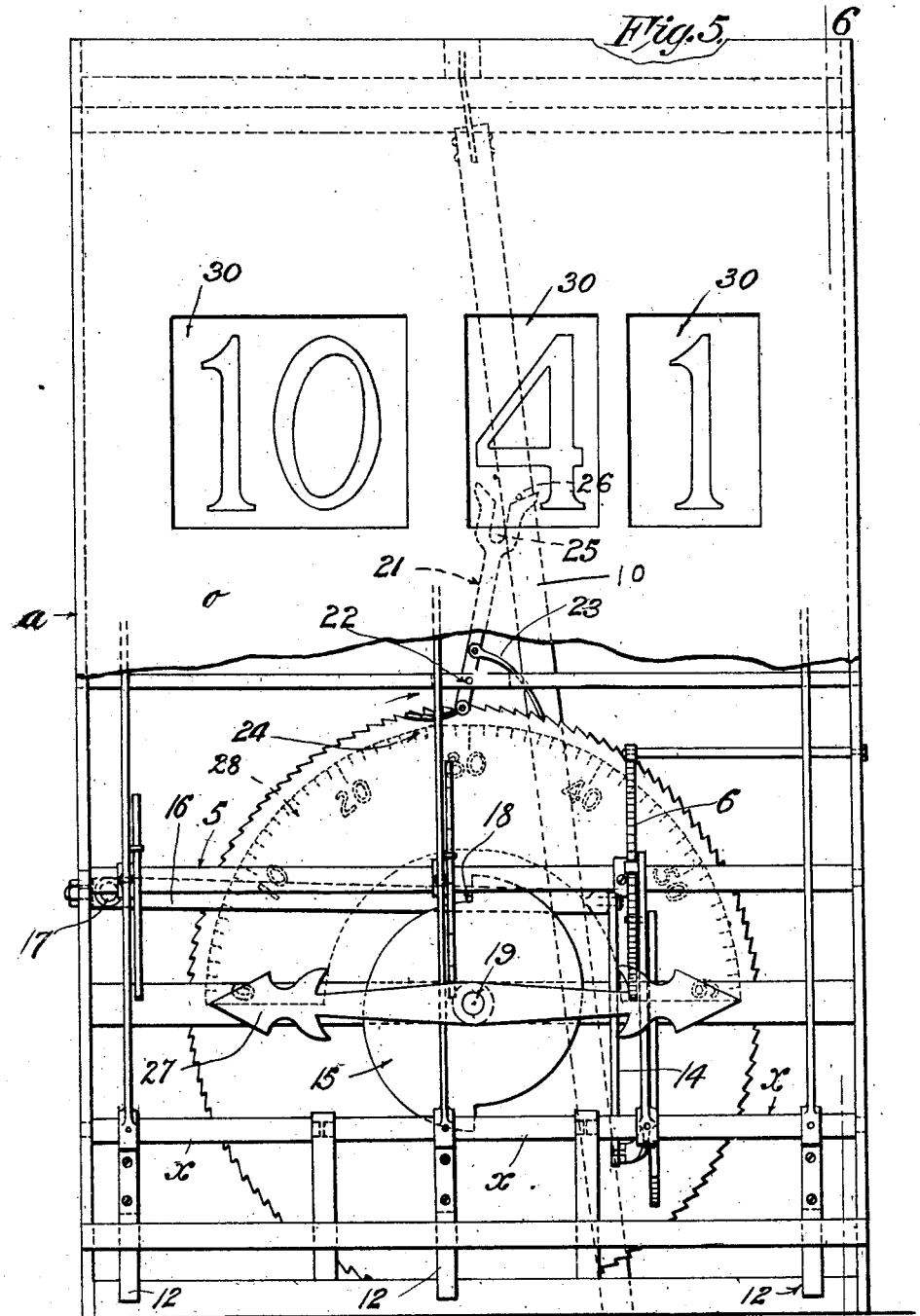

S. P. THRASHER.
TIME INDICATING DEVICE.
APPLICATION FILED SEPT. 4, 1906.

905,956.

Patented Dec. 8, 1908.
5 SHEETS—SHEET 5.

Witnesses:
H. L. Sprague.
H. W. Bowen.

Inventor.
Samuel P. Thrasher,
by Chapin & Co.
Attorneys.

UNITED STATES PATENT OFFICE.

SAMUEL P. THRASHER, OF MANCHESTER, CONNECTICUT, ASSIGNOR TO THRASHER CLOCK COMPANY, OF MANCHESTER, CONNECTICUT, A CORPORATION.

TIME-INDICATING DEVICE.

No. 905,956.      Specification of Letters Patent.      Patented Dec. 8, 1908.

Application filed September 4, 1906. Serial No. 333,167.

*To all whom it may concern:*

Be it known that I, SAMUEL P. THRASHER, a citizen of the United States of America, residing at Manchester, in the county of Hartford and State of Connecticut, have invented new and useful Improvements in Time-Indicating Devices, of which the following is a specification.

This invention relates to time-indicating devices and has especial reference to that class of devices of this kind in which the time is indicated by the exposure of numerals through apertures in the face of the instrument which are shifted at proper periods and in proper sequence to indicate the time. In time-indicating devices of this character, the numerals indicating the hour and minutes are arranged in their proper order on rotating wheels or carriers which, by means of suitable mechanism, have imparted thereto a step-by-step movement which will bring the numerals into view through the openings above referred to, arranged in the face of the instrument. It is obvious that to properly indicate the time by numerals in this manner, the hour indicators must be mounted on a carrier which will rotate one-twelfth of a revolution at each step, the next carrier at the right indicating tenths of an hour will rotate but six times, while the third carrier at the right of the last (which, in combination with the second one indicates the minutes) will have a rotative step-by-step movement at minute intervals. This principle of indicating time is not new, the object of this invention being to provide improved means to actuate the various indicator-carriers to represent the hours and minutes whereby each carrier will have imparted thereto a rotary step-by-step movement from a shaft common to all of them, but actuating each carrier independently of the other, improved locking devices being provided for each carrier.

A still further object of the invention is to provide indicator tablets or parts of novel construction associated with a carrier adapted to receive the same whereby the number of indicator cards or tablets required will be only one-half of the number of steps required to rotate the carrier once, each card or tablet having a numeral on each side thereof and being automatically reversible during the rotation of the carrier to present these numerals before an aperture in their proper sequence.

This time indicating device shown herein may be actuated by a pendulum in the manner shown in my prior United States patent dated July 17, 1900 No. 653,713 as a primary or master clock, or as a secondary clock by means of the electro-magnet shown herein, the invention in this application running particularly to the indicator carriers and actuating mechanism therefor in combination with any prime mover for said mechanism. Where one or more of these time-indicating devices is used as a secondary clock, a similar master clock actuated by a pendulum or other prime mover is connected with the secondary clock in an electrical circuit whereby upon every movement of the unitary time-indicating devices of the master clock, impulse will be imparted to the secondary clocks as described in my said Patent No. 653,713.

The invention is clearly illustrated in the drawings, in which—

Figure 2:
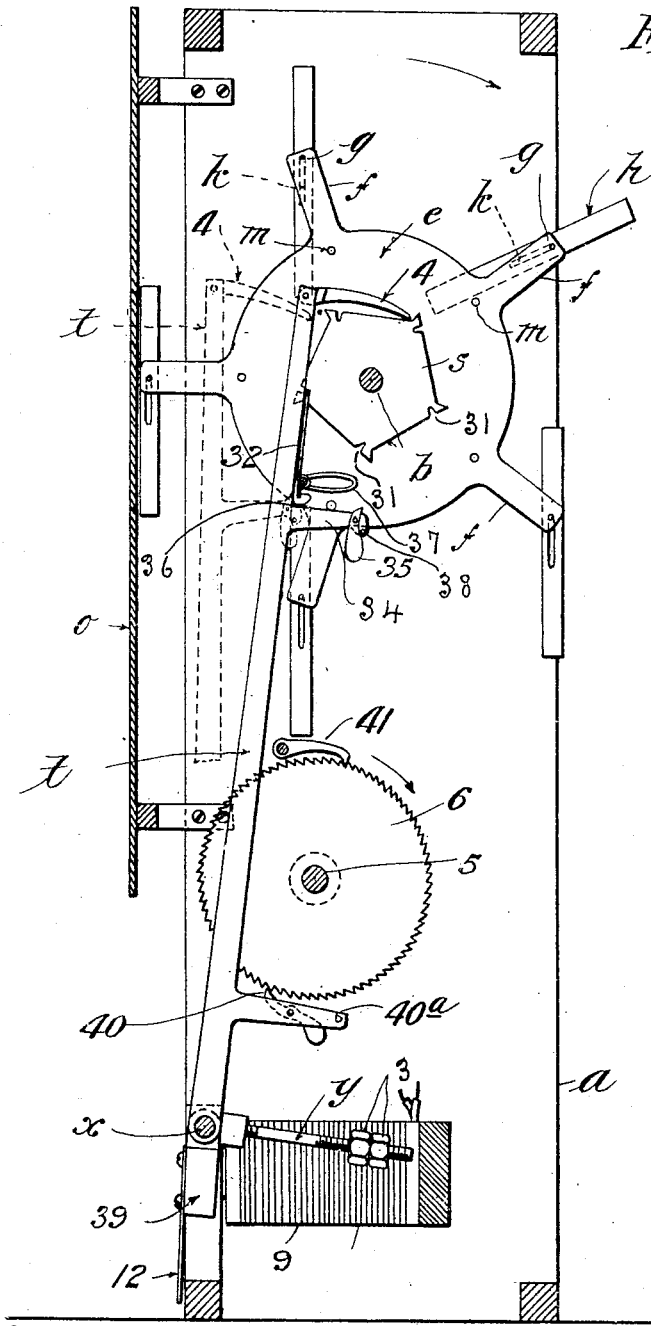
Figure 6:
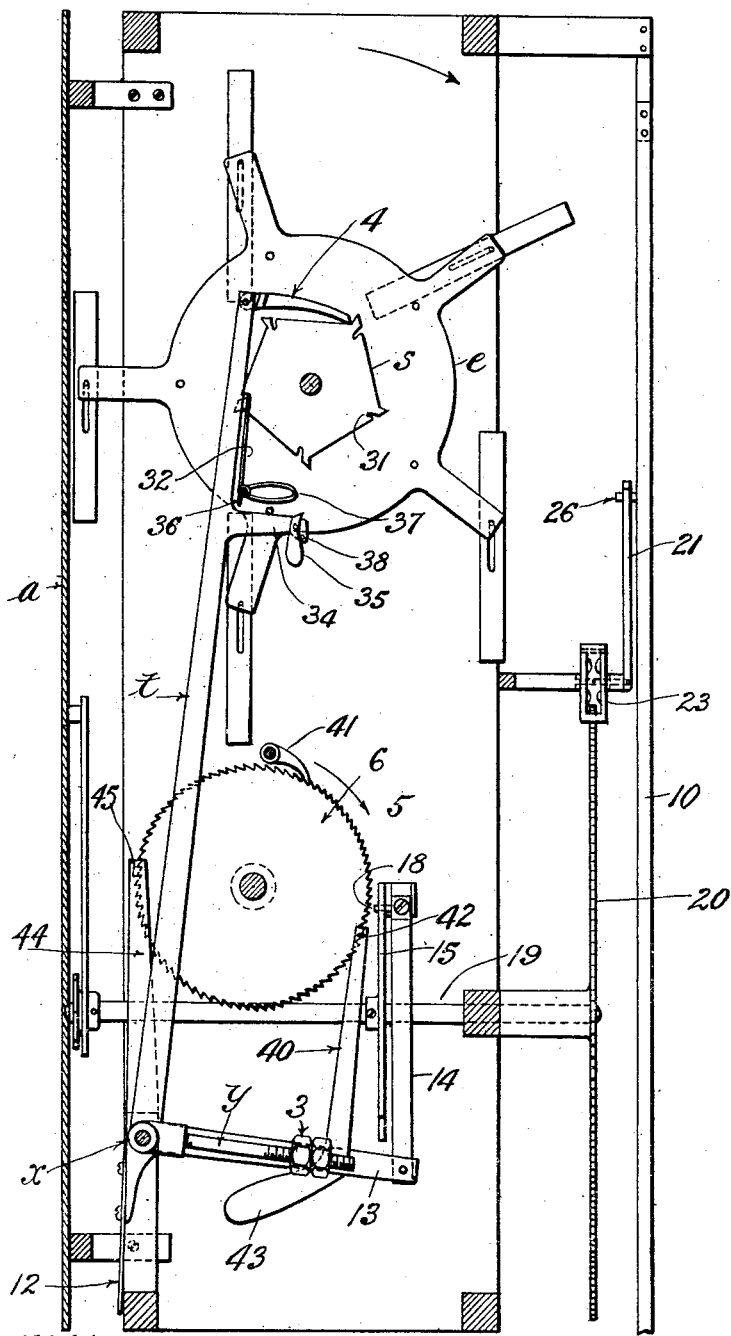

Figure 1 is a front elevation of a time-indicating device in which the invention is embodied, this view showing the construction as employed in a secondary clock. Fig. 2 is a vertical sectional view in the plane of line 2—2, Fig. 1, showing the construction of the mechanism employed to actuate the carrier of the unitary minutes indicators and means to actuate the cam-shaft whereby the other carriers are actuated at the proper time and at proper sequence. This view shows also the novel construction of the indicator tablets forming part of this invention, and the manner in which they are reversibly supported on the carriers. This view should be read looking in the direction of the arrows shown on Fig. 1. Figs. 3 and 4 are sectional views taken respectively in the plane of lines 3—3 and 4—4, Fig. 1, looking in the direction of the arrows, and show the cams whereby the devices which effect the rotation of the carriers are actuated at the proper time and in proper sequence, and independently one of the other. These Figs. 1 to 4 inclusive, relate to the construction as embodied in the secondary clock, that is one dependent upon a master clock, or its actuating impulses. Fig. 5 is a front elevation of the time-indicating device similar in construction to that illustrated in the preceding figures with the exception that Fig. 5 illustrates the construction as applied to a master clock and with which is associated the seconds-indicating device embodied in my prior United States patent dated July 17, 1900 #653,713. Fig. 6 is a sectional view taken in the plane of line 6—6, Fig. 5, showing the construction of the mechanism employed for rotating the carrier-actuating cam-shaft by means of a pendulum in the construction as embodied in the master-clock.

Referring now to these drawings, a indicates the case or boxing of the instrument, and extending transversely therethrough and parallel with the face thereof is a shaft b on which are mounted the carriers c, d, and e shown in side elevation in Figs. 2, 3 and 4. These carriers are rotatable on the shaft b independently one of the other and consist of two end disks provided with radially disposed arms f oppositely located one relative to the other having pins g therein on which are hung tablets h. These tablets are provided in opposite ends thereof with elongated slots k into which the pins g enter. Nearer the center of the carriers other pins m are secured in the disks and extend inwardly into overlapping relation with the tablets h (see Fig. 2) whereby as the carriers rotate and one of the tablets is carried over the center it is prevented from going over in its vertical position, the lower end thereof being caught on the pins m; and thus as the carrier rotates this tablet will eventually slide downwardly and outwardly on the pins g, thus reversing itself. By this means, both sides of the tablet may have a numeral applied thereto and thus where ten exposures of a numeral are required, as in the unitary minutes-indicator, but five tablets would be necessary to display the ten numerals. The same is true of the carrier c, the tablets of which indicate the hours,—only six of these being required to make the twelve exposures necessary. This construction is a very great improvement over the constructions shown in my previous patents which have shown these indicators usually in the form of drums or belt or linked cards or tablets running loosely over suitably arranged carriers, all of the forms of which are objectionable, the drums on account of their form, and the belt-forms on account of a lack of accuracy in presentation of the numerals behind the apertures, and because of a lack of suitable wearing qualities. Furthermore, there is a great saving of space in the manufacture of the form of carrier and indicator devices forming the subject of this application.

The front of the instrument is provided with a face-plate o in which are suitable apertures p, q, and r past which the numerals on the carriers are moved step-by-step, and opposite which they are brought to a stop for the proper length of time. While the carriers have been specifically described as consisting of end disks having radial arms between which the tablets are reversibly mounted, it is to be understood that the invention is not confined to any specific construction of carrier but resides broadly in the construction embodying the idea of reversible time-indicating tablets, the numerals of which are brought into view by the step-by-step rotation of the carrier, suitable mechanism being provided to rotate these carriers at the proper time and in the proper sequence.

The carriers carrying the indicating tablets are rotated step-by-step in the manner described by means of a ratchet and pawl mechanism associated with each carrier, the ratchet-wheels being indicated by s, the pawl-levers for the carriers being indicated by t, v, and w. These are all mounted on shafts x near the lower part of the front of the instrument, the shafts having a common axis, and each is provided with an arm y carrying adjustable weights 3 which are heavy enough to rotate on one of the carriers after the pawl-lever has been swung towards the front of the casing to the position shown in dotted lines in Fig. 2, to pick up one of the teeth of the ratchet-wheel s, there being a pawl 4 on the upper end of the pawl-levers to engage these teeth.

The pawl-lever t, as shown in Fig. 2, is the one which effects the rotation of the cam-shaft 5 which extends transversely of the casing parallel with the carrier-shaft b, and it has fixed thereon a ratchet-wheel 6 having sixty teeth and the two cams 7 and 8, the first having six leaves whereby the carrier d may be rotated six times an hour, and the cam 8 having only one projection thereon whereby for every six steps of the carrier d, it may make one step, and the ratchet-wheel 6 may make sixty.

To provide means to hold the carriers stationary during the intervals between the rotative steps thereof, suitable locking pawls have been provided which will be described further on.

Both in the secondary and in the primary time-indicating devices herein shown, the pawl-lever t, (which actuates the unitary minutes-indicating carrier e) is used to impart rotation to the cam-shaft 5, and in the secondary mechanism this is effected by the energizing of an electro-magnet 9 by the closing of an electrical circuit connected with the master mechanism in which actuating impulses are imparted to the pawl-lever t by means of a pendulum 10, the construction of the latter mechanism being such that the electric circuit is closed synchronously with the actuation of the unitary minutes-indicator in the master mechanism.

The end of the pawl-lever t extends below the shaft x and has secured thereon a spring 12 so disposed that when the lever t is in a perpendicular position, the spring will be put under some degree of tension whereby when the lever is released in the manner about to be described, said spring will impart to the lever its initial impulse, the actual work of rotating the carrier being accomplished by the weight 3. These oscillating movements of the lever *t* are imparted thereto as follows: On the short shaft *x* which carries one of the arms *t* and its actuating weight, is a crank-arm 13 about parallel with the arm *y*, and pivotally secured to the end of this crank-arm is a vertically disposed connecting-arm 14 which is connected pivotally to the end of an arm 16 pivoted at 17 to the case of the instrument, as shown in Fig. 5, and this arm 16 runs close to the side of the cam 15 and has secured in it a pin 18 which bears on the cam. Therefore, as the latter revolves, the arm 16 is raised and through the connecting arm 14 and crank-arm 13 tilts the pawl-lever *t* in the manner described, at intervals of one minute. This cam is secured to a shaft 19 which extends across the instrument under and at right angles to the cam-shaft 5, and has secured on the rear end thereof a ratchet-wheel 20 having 120 teeth thereon which is rotated one tooth at a time by the movement of the pendulum by means of a rock-arm 21 pivoted at 22 and carrying the actuating pawls 23 and 24; the upper end of the rock-arm is forked, as at 25, and is engaged by a pin 26 in the pendulum-rod as the latter swings back and forth. On the opposite end of the shaft 19 is secured the double-pointed seconds-pointer 27 which is arranged to sweep over a seconds scale 28 (shown in dotted lines in Fig. 5,) which is divided into sixty spaces on the half circle so that as one end of the pointer leaves the sixty at one end, the opposite end begins with zero on the opposite side of the scale. This method of indicating the seconds on a semi-circular scale, and the pendulum-actuated ratchet-wheel constructed as above described, do not, *per se*, constitute any part of this invention and will be claimed herein only in connection with other novel features, these devices having been embodied in my said prior Letters Patent No. 653,713.

In the face of the case *a*, apertures 30 are cut, three in number, through which, by the rotation of the carriers, the indicator tablets are exposed to view to indicate the time by hours and minutes. Another semi-circular aperture (not shown) is formed in the case back of which the semi-circular seconds scale is exposed and over which the two ends of the seconds pointer 27 sweep.

From the foregoing description, it is clear that the ratchet-wheel 20, actuated by the pendulum will effect the rotation of the cam 15 and the seconds pointer, and that the pin 18 on the arm 16 will drop off one of the points of said cam at every half revolution of the ratchet-wheel 20 or every minute, and this serves to impart a rotative step to the unitary minutes carrier *e*, which, in turn, serves to actuate rotatively the ratchet-wheel 6 on the cam-shaft 5, thus providing for that shaft such rotative movement as will permit the other cams 7 and 8 thereon to actuate their respective carriers *d* and *c* at the proper time and in proper sequence.

Each of the ratchets *s* is provided, of course, with the number of teeth equal to the number of indicator-tablets mounted on the carrier, and in the periphery of these ratchets, preferably close to each tooth, is a deep locking notch 31. These notches are engaged by a gravity-pawl 32 which may be supported in any convenient manner in operative relation to the notches, as for example on arms 33 secured to the upper part of the casing and extending downwardly therefrom towards the ratchet-wheels, as shown in the various sectional elevations.

On each of the pawl-levers *t*, *v*, and *w* is a short projecting arm 34 which carries a tripping-latch 35 pivotally hung thereon the upper end of the latch extending beyond the edge of the arm in position to engage a short arm 36 on the gravity-pawl 32, whereby as the pawl-lever swings forward, (that is from the dotted position shown in Fig. 2 to the position shown in full lines in said figure,) the pawl 32 will be tripped and withdrawn from its locking notch in the ratchet on the first movement of the pawl-lever forward. Before the pawl 4 comes into engagement with the teeth of the ratchet-wheel, the point of the latch 35 comes in contact with the short end 36 of the pawl lifting the latter out of the notch, and the ratchet-wheel will have been rotated far enough so that when the pawl falls, by means of its weighted end 37 it will drop on the straight portion of the ratchet between two teeth, and that tooth of the latter which was overlapped by the pawl will have passed on, the pawl being in position to drop into the next notch.

When the pawl-lever *t*, *v*, or *w* is swung back to the dotted position shown in Fig. 2 by the rotation of its particular cam 7 or 8, the upper end of the latch 35 will, when it comes in contact with the projection 36 of the pawl, be swung on its pivot and pass under said projection, but it is prevented from swinging in the opposite direction by means of a stop-pin 38 in the arm 34.

In the secondary time-indicating device, the unitary minutes-indicator carrier, (that is the carrier *e* shown in Fig. 2,) has its pawl-lever *t* actuated by means of the electro-magnet *y*, an armature 39 being secured to the rock-shaft *x* on which said pawl-lever is secured, and when the circuit in which said electro-magnet is included is closed, the pawl-lever is thrown back to the position shown in dotted lines in said Fig. 2, and a pawl 40, hung on a short arm on said lever in engaging position with the teeth of the ratchet-wheel 6, will impart to the latter rotative movement.

The position of the pawl 40 relative to the shaft $x$ is such that the lever $t$ will have more or less of a swinging movement before said pawl picks up its tooth of the ratchet-wheel to the end that the actual rotative impulse of said ratchet-wheel and the cam-shaft 5 will be at that moment when the greatest force of the electro-magnet is exerted on the armature, that is when the armature closely approaches the end of the cores of the magnet. The stop pin 40$^a$, Fig. 2, is shaped to fit between two teeth, to prevent backward rotation of the cam-shaft 5. A stop-pawl 41 is located above the ratchet 6 to the end that as the pawl 40 sweeps over a tooth when the lever $t$ moves forward to rotate a carrier, there will be no danger of rotating the cam-shaft backwards to any degree.

In the primary time-indicating device, movement is imparted to this ratchet-wheel 6 in a very similar manner with the exception that the pawl 40 (see Fig. 6) is arranged to engage the ratchet-wheel at a different point of its periphery owing to the fact that the pawl-lever $t$ in this master mechanism is gravity-actuated, and therefore the pawl 40 is arranged to give a rotative impulse to the cam-shaft when the pawl-lever swings forward by gravity to rotate its carrier, this rotation of the cam-shaft being effected by the engagement of the pin 42 on the pawl with one of the ratchet-teeth, which pin is held in engagement with these teeth by means of the weighted end 43 of the pawl 40. In this mechanism, the same stop-pawl 41 is used as described in connection with the secondary mechanism, but in addition to this, a second stop for the ratchet-wheel 6 is provided in the arm 44 which is secured to the shaft $x$ in such position that at the end of the forward movement of the pawl-lever $t$, a pin 45 therein will come into engagement with the ratchet-wheel and be held yieldingly thereagainst by the weight of the parts which actuate the pawl-lever, and thereby provide not only a stop-pawl to prevent the rotation of the ratchet-wheel backwards, but will constitute a brake to prevent the overthrow of the ratchet-wheel.

What I claim, is:—

1. A time-indicating device comprising a plurality of carriers having a rotating step-by-step movement on a common axis, separate indicators, as cards or tablets, pivotally mounted in said carriers to rotate on an axis parallel with the axis of the latter, said indicators having elongated slots in opposite edges thereof, and pivot-pins extending into said slots, the maximum weight of the indicators being below the axis of the latter.

2. A time-indicating device comprising carriers, a cam-shaft, cams thereon, gravity-actuated pawl-levers bearing on the cams and periodically released thereby to rotate certain of the carriers step-by-step, a ratchet-wheel on said cam-shaft, and a pawl on one of the pawl-levers to engage said ratchet-wheel, and a prime mover to swing the last-named pawl-lever to operative position, said last-named pawl-lever serving to effect the rotation of the unitary minutes-carrier and simultaneously the rotation of the cam-shaft, whereby rotative movement may be imparted to the other carriers at the proper time.

3. A time-indicating device comprising a plurality of carriers having independent rotative step-by-step movements on a common axis, a ratchet-wheel associated with each carrier, a locking device for each ratchet-wheel, a gravity-actuated swinging pawl-lever to engage each ratchet-wheel, cams on which certain of said pawl-levers bear whereby they are swung back to operative position, and an electro-magnet to actuate another of said pawl-levers to swing it to operative position, each of said levers being provided with a spring which is put under tension by said backward movement of the pawl-levers whereby initial impulse will be imparted to the levers when the latter are released.

SAMUEL P. THRASHER.

Witnesses:
Wm. H. Chapin,
H. W. Bowen.